United States Patent [19]
Ahrens

[11] Patent Number: 5,398,983
[45] Date of Patent: Mar. 21, 1995

[54] GRIPPING APPARATUS

[76] Inventor: Anthony P. Ahrens, PO Box 63, Currumbin, Gold Coast, Queensland 4223, Australia

[21] Appl. No.: 102,860

[22] Filed: Aug. 6, 1993

[51] Int. Cl.⁶ .................................................. B66F 9/18
[52] U.S. Cl. ........................... 294/106; 294/86.4; 294/902; 414/406
[58] Field of Search ............... 294/86.4, 99.1, 106, 294/111, 88, 902; 414/406, 407, 408, 620, 621

[56] References Cited

U.S. PATENT DOCUMENTS

| | | | |
|---|---|---|---|
| 3,322,455 | 5/1967 | Gressbach | 294/902 X |
| 3,970,342 | 7/1976 | Cotton | 294/86.4 |
| 4,084,706 | 4/1978 | Russell | 294/111 X |
| 4,403,801 | 9/1983 | Huff et al. | 294/93 |
| 4,435,117 | 3/1984 | House | 414/620 |
| 4,669,940 | 6/1987 | Englehardt et al. | 414/303 |
| 5,020,844 | 6/1991 | Pickrell | 294/86.4 |
| 5,209,537 | 5/1993 | Smith et al. | 294/106 X |

FOREIGN PATENT DOCUMENTS

| | | | |
|---|---|---|---|
| 562478 | 6/1987 | Australia . | |
| 572684 | 5/1988 | Australia . | |
| 60231/90 | 8/1990 | Australia . | |
| 1323372 | 7/1987 | U.S.S.R. | 294/86.4 |
| 1335452 | 9/1987 | U.S.S.R. | 294/86.4 |

Primary Examiner—Dean J. Kramer
Attorney, Agent, or Firm—Kimmel, Crowell & Weaver

[57] ABSTRACT

Gripping apparatus for gripping articles or objects such as refuse bins including a support frame carrying a first pivotally mounted arcuate support arm carrying a flexible element and a second pivotally mounted arcuate support arm carrying a flexible element, the elements being secured to the frame. The arms may be actuated to move towards each other so that the flexible elements partially wrap around the article or object to grip same.

20 Claims, 4 Drawing Sheets

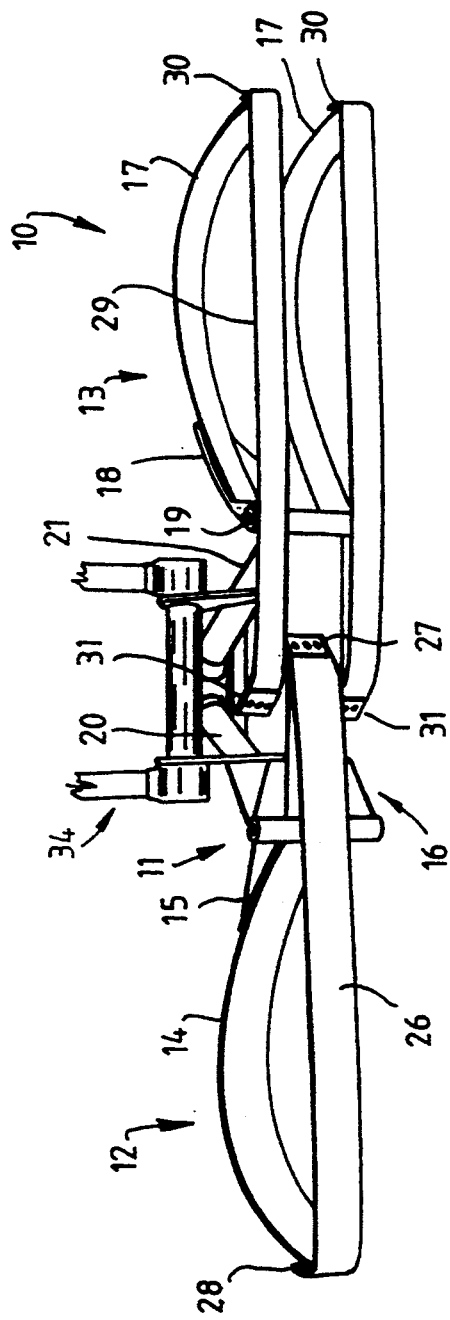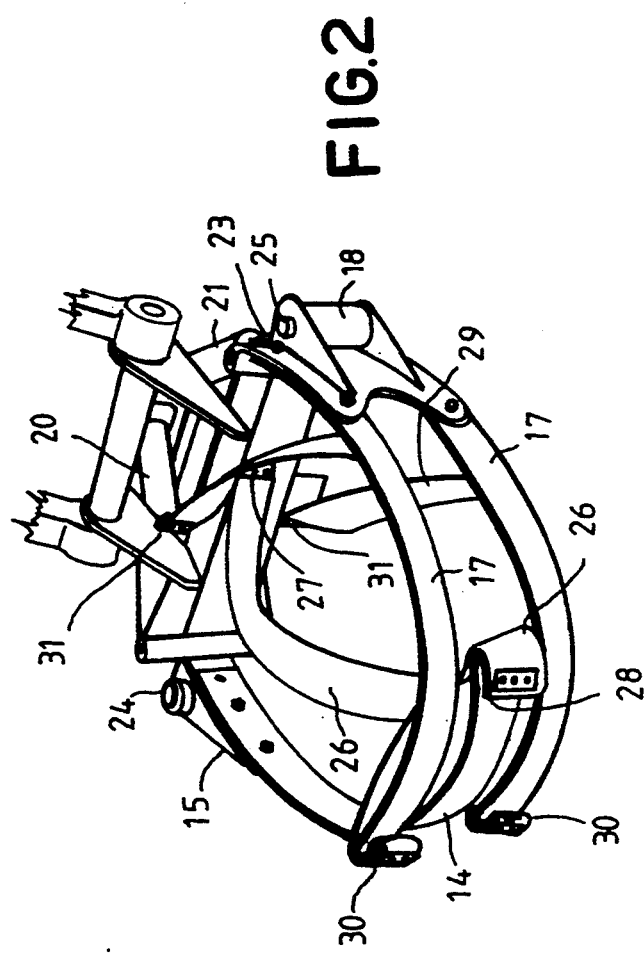

GRIPPING APPARATUS

TECHNICAL FIELD

This invention relates to gripping apparatus, particularly but not exclusively applicable to the gripping of refuse containers for facilitating their lifting and deposit of their contents into a mobile refuse vehicle.

BACKGROUND ART

In many municipalities, the conventional metal or plastic garbage bin has been replaced by a mobile bin which for collection purposes is placed adjacent a roadway so as to enable a refuse collection vehicle to engage the bin and deposit its contents into a hopper, whereafter a compactor may compact the collected refuse. A number of different types of bin engaging devices have been employed to enable a bin to be securely engaged and lifted for tipping the contents thereof. One common type of lifter engages under the rim of the bin whilst clamping the top side thereof so that the bin may be readily grasped, elevated and tipped. A disadvantage of this arrangement, however, is that it is relatively slow requiring the bin to be accurately aligned with the lifting mechanism prior to elevation. Furthermore such a mechanism has limitations in its height of operation making engagement with bins located below the road level extremely difficult. To overcome these disadvantages other arrangements have been used. In one such arrangement a mechanical gripping jaw assembly is actuated to simply grip about the sides of the bin, however, such gripping assemblies often exert only a point contact on the bin so as to either cause damage thereto or not exerting a sufficient gripping force on the bins to enable them to be lifted. Whilst such arrangements are useful in grasping bins at a range of elevations, they are not readily adapted for use with bins of different sizes. One further alternative arrangement has been to employ a suction principle wherein the bin gripping devices are in the form of suction pads to which a vacuum is applied with the aim of firmly grasping the side of the bin using suction force. In such devices, however, damage or scratching of the bin often prevents the vacuum being maintained so that the gripping is not effective. Difficulties are also encountered if the bin is wet.

SUMMARY OF INVENTION

The present invention aims to overcome or alleviate one or more of the above disadvantages or at least provide an alternative to the above arrangements by providing a gripping apparatus particularly suited for the gripping of refuse bins but which may be applied to the gripping of other articles or objects and which serve to grip bins or other articles in a reliable and efficient manner. The present invention aims also in a preferred aspect to provide gripping apparatus which is readily adapted to efficient gripping of articles or objects of a range of sizes and which also eliminates or substantially reduces or minimizes the risks of damage to articles or objects being gripped. Other objects and advantages of the invention will become apparent from the following description.

The present invention thus provides in a preferred aspect gripping apparatus for gripping an object such as a refuse bin, said apparatus including support means, pivotal arm means mounted to said support means for movement about a pivot axis, a flexible element secured to said arm means, and to said support means at a position spaced from said pivotal axis, and actuating means for pivoting said arm means so as to cause said flexible element to locate in use at least partially about said article or object for gripping of same.

The term "flexible element" or "flexible element means" used throughout the specification and claims includes cables, belts, wires, a fabric material, strapping, or any other element having similar properties.

The arm means preferably comprises an arm of concave form on its side adjacent the object or article to be gripped. Most preferably, the arm means is of arcuate form.

In one preferred form, the apparatus includes a pair of spaced apart arm means, each supporting a respective flexible element, and each being adapted to be located on opposite sides of an article or object to be gripped and being movable to a position where the respective flexible elements engage about opposite sides of the article or object for gripping of same.

Suitably, respective actuator means are associated with each arm means for moving the same, the actuator means being operative to move the arm means simultaneously in opposite directions. One of the arm means may comprises a first pair of arms spaced apart along the pivotal axis of that arm means and the other arm means may comprise an arm arranged to move between the arms of the first pair. The flexible element/s is/are normally in a slack attitude, and is/are tensioned upon wrapping about and gripping the article.

In one preferred form, the gripping apparatus is associated with a lifting mechanism of a refuse collection vehicle and the apparatus is adapted for gripping a refuse bin whereby a bin gripped by the apparatus may be raised and upended so that the contents thereof may be emptied into the vehicle.

BRIEF DESCRIPTION OF THE DRAWINGS

In order that the invention may be more readily understood and put into practical effect, reference will now be made to the accompanying drawings which illustrate a preferred embodiment of the invention and wherein:

FIG. 1 is a front view of the gripping apparatus of the invention with the arms open;

FIG. 2 is a view from the front of the gripping apparatus with the jaws closed;

DETAILED DESCRIPTION OF THE DRAWINGS

Figure 3:
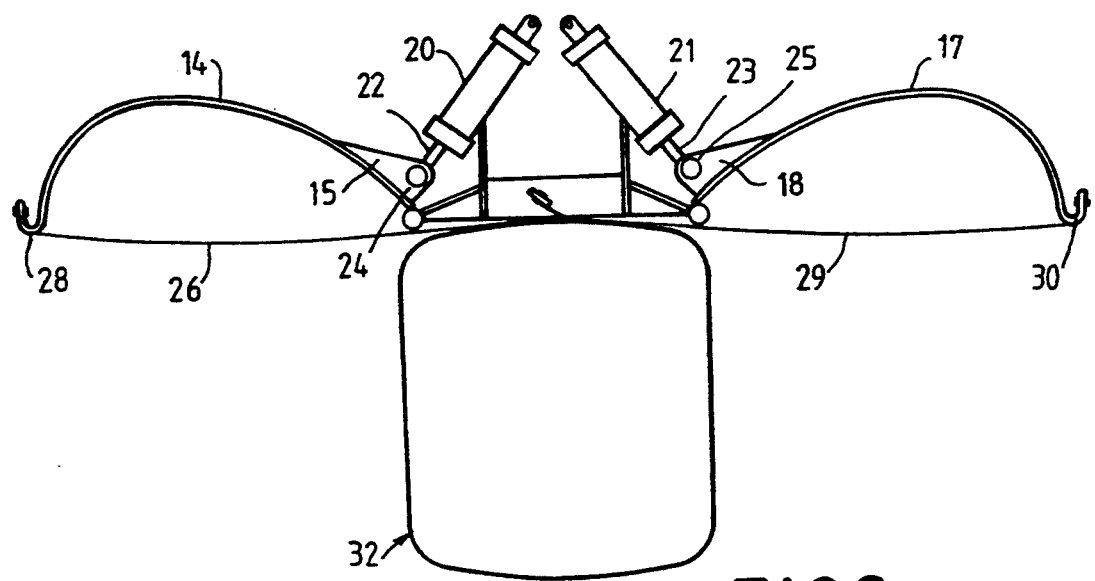
FIG. 3 is a somewhat schematic plan view of the gripping apparatus according to the present invention in an inoperative attitude.

Referring to the drawings and firstly to FIGS. 1 to 3 there is illustrated gripping apparatus 10 according to the invention including a support frame 11 adapted to be secured say to a loading mechanism of a refuse vehicle of any suitable type where the gripping apparatus 10 is to be used for gripping refuse bins. Mounted pivotally on the support frame 11 at spaced apart positions are respective support arms assemblies 12 and 13. The support arm assembly 12 includes an arcuate support arm 14 mounted at its inner end to a bracket 15, the latter being mounted via a trunnion assembly 16 to the frame 11 so as to enable the support arm 14 to be moved pivotally relative to the frame 11. The opposite support arm assembly 13 includes a pair of substantially parallel spaced apart arcuate support arms 17 (similar to the arms 14) which are secured at their inner ends to a common support bracket 18 mounted to the frame 11 via a trunnion assembly 19 spaced from the trunnion assembly 16, the trunnion assemblies 16 and 19 having substantially parallel pivotal axes. The arms 17 are offset on opposite sides of the arm 14 so that the latter may pass therebetween and for equalizing of gripping force as described further below.

The brackets 15 and 18 are arranged to be pivoted by respective hydraulic (or pneumatic) rams 20 and 21, the rams 20 and 21 being mounted pivotally on the frame 11 and having piston rods 22 and 23 coupled pivotally at 24 and 25 respectively to the brackets 15 and 18. It will be apparent that actuation of the rams 20 and 21 in opposite directions will through the brackets 15 and 18 cause pivotal movement of the arms 14 and 17 in opposite directions towards and away from each other. Preferably the rams 20 and 21 associated with each arm assembly 12 and 13 are operated simultaneously and preferably for this purpose are hydraulically or pneumatically interconnected so as to cause simultaneous pivotal movement of the arm assemblies 12 and 13 towards and away from each other.

A flexible element 26 is fixed at one end to a lug 27 on the frame 11 and at its opposite end to the free end of the arm 14. For this purpose, the end 28 of the arm 14 is turned back on itself and the element 26 looped therearound and secured thereto by means of through fasteners. Similar arrangements are provided for the arms 17 with flexible elements 29 being secured at one end to the free ends 30 of arms 17 and at their opposite ends to respective lugs 31 on the frame 11. The elements 26 and 29 preferably comprise a fabric type strapping material such as the type used in lifting slings and are normally substantially unstretchable.

For movement to the inoperative position, the rams 20 and 21 are actuated to pivot the arms 14 and 17 outwardly as shown in FIGS. 1 and 3. In this position, the elements 26 and 29 are normally not under tension and are usually somewhat slack. When the rams 20 and 21 are actuated in the opposite direction, the arms 14 and 17 are moved inwardly towards each other carrying the elements 26 and 29 as shown in FIG. 2.

Figure 4:
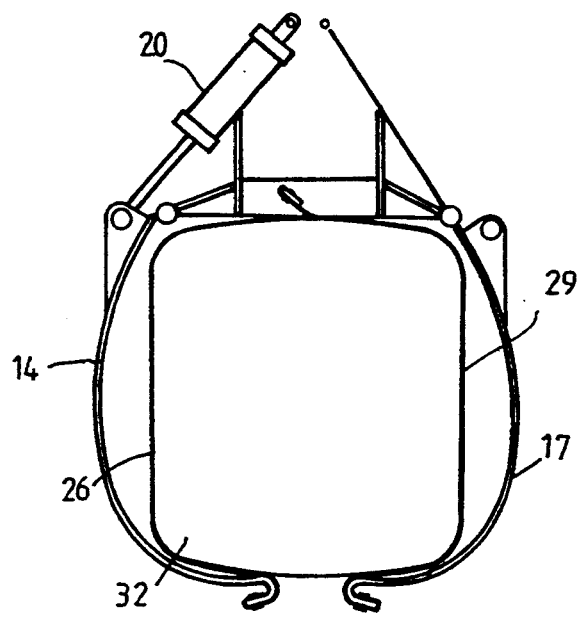
FIG. 4 is a somewhat schematic plan view illustrating the manner in which the gripping apparatus of the invention engages about a refuse bin.
Figure 5:
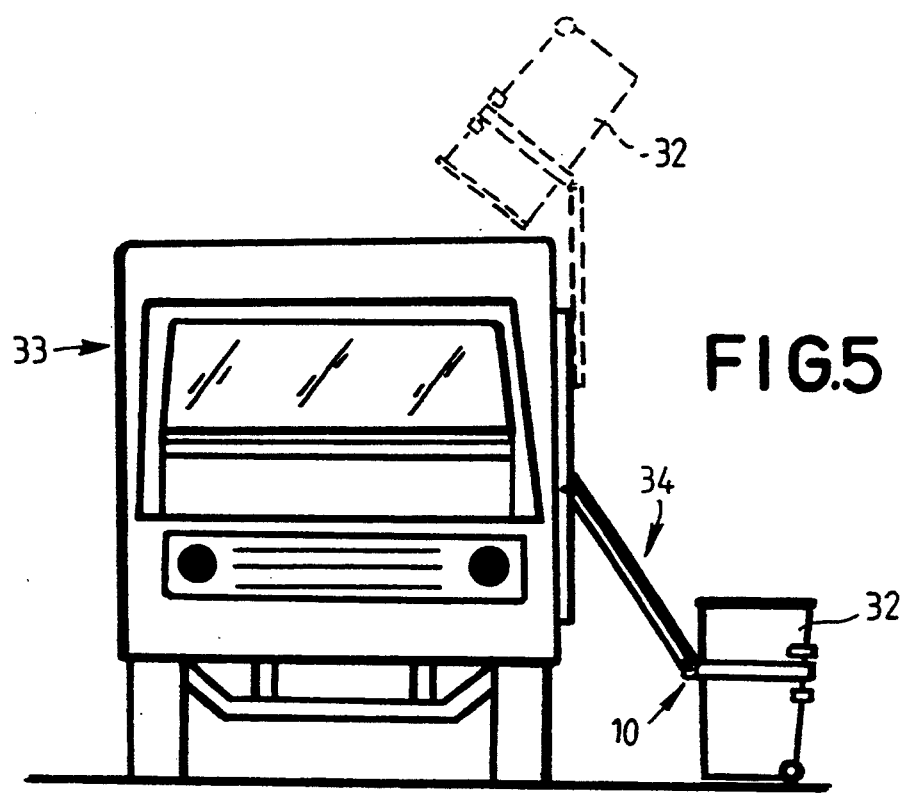
FIG. 5 illustrates schematically, the operation of the gripping apparatus of the invention when associated with a refuse vehicle.

In use and as shown in FIGS. 3 to 5 the apparatus 10 is adapted for gripping a refuse bin 32 and for this purpose may be mounted to a refuse vehicle 33, the refuse vehicle 33 having a elevating and lifting mechanism 34 to which the frame 11 of the gripping apparatus 10 is mounted. After the apparatus 10 is moved adjacent to the bin 32, the rams 20 and 21 are expanded preferably simultaneously to pivot the arms 14 and 17 inwardly towards each other and about the bin 32 so as to cause the elements 26 and 29 to be wrapped at least partially around the bin 32 on each side becoming tensioned to thereby exert an even gripping force about a substantial periphery of the bin 32. After the bin 32 has been gripped as above, the gripping apparatus 10 may be elevated and thereafter pivoted to upturn the bin 32 as shown in dotted outline in FIG. 5 to allow discharge of its contents into the refuse vehicle. The apparatus 10 may then be lowered to deposit the bin 32 on the ground and the rams 20 and 21 retracted so as to move the arms 14 and 17 back to the position of FIGS. 1 and 3.

Figure 6:
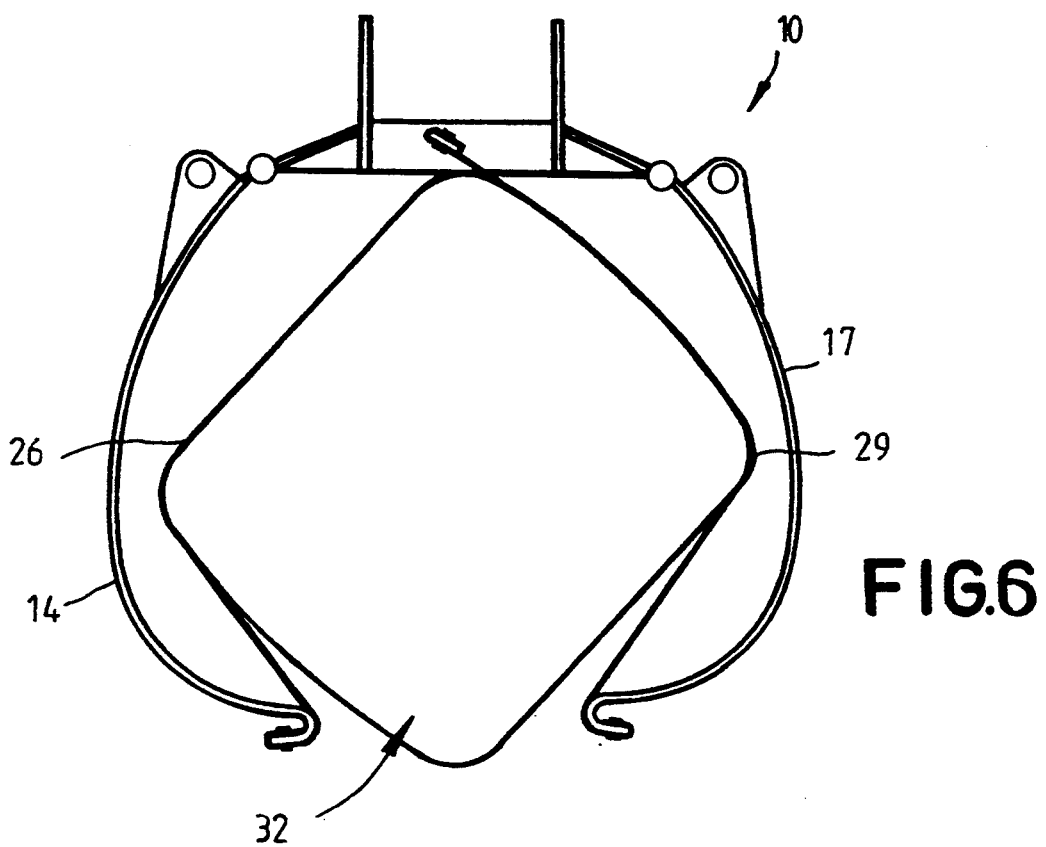
FIG. 6 illustrates schematically in plan view the manner in which the apparatus of the invention grips a misaligned bin.
Figure 7:
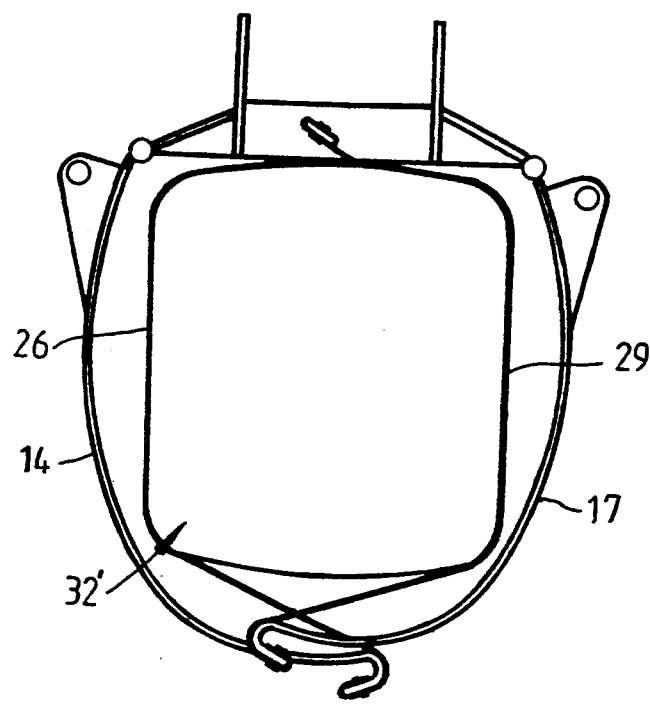
FIG. 7 illustrates in schematic plan view the manner in which the apparatus engages with a smaller bin.
Figure 8:
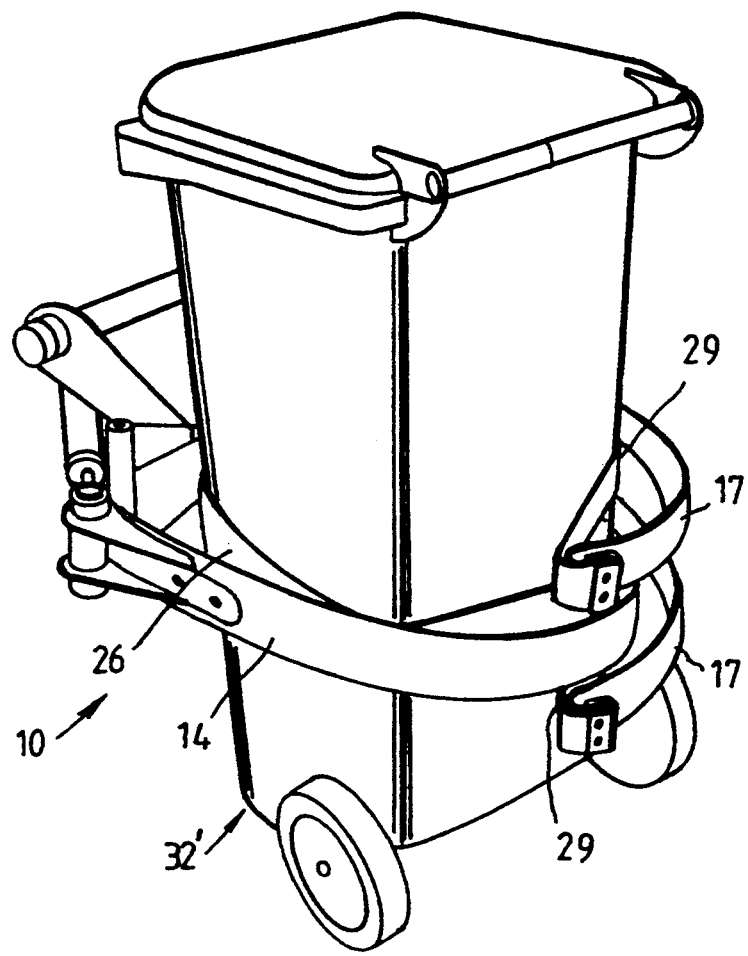
FIG. 8 illustrates in perspective view the gripping apparatus of the invention gripping a smaller refuse bin.

If the bin 32 is misaligned by not being square on to the gripping apparatus 10 as for example as shown in FIG. 6, the apparatus 10 can still grip the bin 32 by actuating the arms 14 and 17 as previously so that again the flexible elements 26 and 29 wrap at least partially about the sides of the bin 32 to firmly and evenly engage the bin 32 for lifting purposes. In each case, the offset nature of the arms 14 and 17 and thus the elements 26 and 29 is such as to ensure even opposed gripping of the bin 32 in the nature of gripping an object between the thumb and two fingers of the hand.

Where the apparatus 10 is to be used for gripping smaller articles such as the smaller bin 32' shown in FIGS. 7 and 8, the arms 14 and 17 are actuated by the rams 20 and 21, to move inwardly towards each other and overlap so that the arm 14 and its supported flexible element 26 may pass between the arms 17 and its elements 29 whilst ensuring the bin 32' is firmly gripped with no overturning moment.

Preferably the arms 14 and 17 are formed of a resilient material such as spring steel or other similar material so as to provide a resilience between the elements 14 and 17 and the support frame 11. The arms 14 and 17 will thus resiliently deflect upon the elements 26 and 29 engaging the bin or other article so as to avoid crushing of same whilst at the same time maintaining a firm gripping force on the bin or article.

When applied to use with a refuse collection vehicle, the gripping apparatus 10 may be mounted to any suitable elevating and tipping mechanism 34 such as those shown in Australian Patent Nos. 572684 and 562478.

The gripping apparatus in a simplified form may include only one arm which supports a flexible element, the arm being mounted for movement towards and away from a load to be carried with the load supported on its side opposite the arm for example against a gripping pad. Alternatively the apparatus may include a pair of opposed gripping arms 14 and 17 which are substantially aligned. The arms 14 and 17 may also carry more than one flexible element 26 or 29, for example spaced apart elements so as to increase the surface area over which the object or article is gripped.

The arms 14 and 17 of the apparatus 10 are preferably arcuate or concave form with the flexible element being located on the concave side. The arms however may be of may other configurations and in some embodiments of linear form. The flexible elements are mounted to the arms in any suitable manner and whilst it is preferred that only one end of each element be secured to the arm, both ends may be secured to the arm at spaced apart locations and being in this arrangement preferably of loose form so as to engage about a substantial periphery of an article to be gripped before becoming taut.

As stated above, the flexible elements may be wires, cables, ropes, straps or any other flexible member and most preferably, the flexible elements are formed of a material which will not damage an article being gripped. The flexible elements may also in some applications be formed of resilient material in which case the support arms for the elements may be of a rigid form or construction. The actuating means for the arms 14 and 17 may be hydraulic or pneumatic rams or mechanical actuating means.

It will be apparent that the use of flexible elements as gripping members enables articles of many different shapes to be gripped as the flexible elements will simply conform substantially to the external periphery of the article.

Whilst the above has been given by way of illustrative embodiment of the invention, all such modifications and variations thereto as would be apparent to persons skilled in the art are deemed to fall within the broad scope and ambit of the invention as herein defined in the appended claims.

I claim:

1. A gripping apparatus for gripping an object, said apparatus including
    support means, pivotal arm means mounted to said support means for movement about a pivot axis,
    a flexible element, said flexible element being fixedly secured to an outer portion of said arm means, and said flexible element being further fixedly secured to said support means at a position spaced from said pivot axis, said flexible element between said outer portion of said arm means and said support means normally being in a non-tense state, and
    actuating means for pivoting said arm means, actuation of said actuating means in a first direction causing said arm means to pivot towards said object and said flexible element to wrap at least partially about said object and thereby be placed in tension for gripping of said object.

2. An apparatus according to claim 1 wherein said arm means comprise an arm of concave form on its side adjacent said object to be gripped.

3. An apparatus according to claim 2 wherein said arm means is of arcuate form.

4. An apparatus according to claim 1 wherein said apparatus includes a pair of spaced apart said arm means, each supporting a respective said flexible element, each said arm means being adapted to be located on opposite sides of an object to be gripped and being movable to a position where the respective said flexible elements engage about opposite sides of said object for gripping of same.

5. An apparatus according to claim 4 wherein respective said actuator means are associated with each said arm means for moving same, said actuator means being operable to move said arm means simultaneously in opposite directions.

6. An apparatus according to claim 4 or claim 5 wherein one of said arm means comprises a first pair of arms spaced apart along the pivotal axis of said arm means and wherein the other said arm means comprises an arm arranged to move between said arms of said first pair.

7. A refuse collection vehicle including gripping apparatus as defined claim 1 and wherein said object comprises a refuse bin, said apparatus being actuable for gripping said bin whereby said bin gripped by said apparatus may be raised and upended so that the contents thereof may be emptied into said vehicle.

8. A refuse collection vehicle according to claim 7 wherein said gripping apparatus is supported to a loading mechanism associated with said vehicle.

9. A gripping apparatus for gripping an object, said apparatus including
    a support frame,
    first arm means supported to said frame for pivotal movement about a first axis,
    second arm means supported to said frame for pivotal movement about a second axis substantially parallel to and spaced from said first axis,
    first flexible element means fixedly secured at one end to a free end of said first arm means,
    second flexible element means fixedly secured at one end to a free end of said second arm means, both said flexible element means being further fixedly secured to said frame at positions spaced from said first and second axes, both said flexible element means normally being in a non-tense state, and
    means for pivotally moving said arm means towards each other so that the respective said flexible element means engage opposite sides of said object whereby said element means are placed in tension and apply a gripping force to said object, and away from each other to release said gripping force.

10. A gripping apparatus according to claim 9 wherein said arm means are of generally concave form on their side adjacent said object to be gripped.

11. A gripping apparatus according to claim 10 wherein said arm means are of arcuate form.

12. A gripping apparatus according to claims 9 wherein said arm means are offset from each other relative to their pivotal axes.

13. A gripping apparatus according to claim 9 and including third arm means spaced from said first arm means and movable therewith, and a third flexible element means fixedly secured at one end to the free end of said third arm means and to said frame at a position spaced from said pivot axes, said first and third arm means being offset from said second arm means relative to said pivotal axes so that said second arm means may move between said first and third arm means.

14. A gripping apparatus according to claim 9 wherein said moving means comprises actuating means between said arm means and said support frame.

15. A gripping apparatus according to claim 14 wherein said actuating means comprise fluid operable rams.

16. A gripping apparatus according to claim 9 wherein said flexible element means are secured to said support frame via brackets arranged between said pivotal axes.

17. A gripping apparatus for use with a refuse vehicle for gripping a refuse container, said gripping apparatus including a support frame, first and second arm means, said first and second arm means being mounted to said support frame for pivotal movement about first and second spaced apart substantially parallel pivot axes, a first flexible element fixed at one end to the outer end of said first arm means and fixed at its other end to an anchoring point spaced from said first pivot axis, a second flexible element fixed at one end to the outer end of said second arm means and fixed at its other end to an anchoring point spaced from said second pivot axes, said anchoring points being provided on said support frame and between said first and second pivot axes, said first and second flexible elements normally being in a non-tense state, and actuating means for actuating said arm means for movement towards and away from each other, movement of said arm means towards each other and a said refuse container located therebetween under the influence of said actuating means causing said flexible element means to wrap about opposite sides of said container and thereby be placed in tension to grip said container.

18. A gripping apparatus according to claim 17, wherein said flexible elements comprise flexible belts.

19. A gripping apparatus according to claim 17, wherein said first and second arm means are of arcuate form between their pivotal axes and their outer ends and have their concave sides adjacent said container to be gripped.

20. A gripping apparatus for use with a refuse vehicle for gripping a refuse container, said gripping apparatus including first and second arm means, said first and second arm means being supported for pivotal movement about first and second spaced apart substantially parallel pivot axes, a first flexible element fixed at one end to the outer end of said first arm means and fixed at its other end to a first anchoring point located between said first and second pivot axes, a second flexible element fixed at one end to the outer end of said second arm means and fixed at its other end to a second anchoring point located between said first and second pivot axes, and actuating means for actuating said arm means for movement towards and away from each other, movement of said arm means towards each other reducing the distance between said outer end of said first arm means and said first anchoring point, and the distance between said outer end of said second arm means and said second anchoring point being such that the respective flexible elements fixed between said outer ends of said arm means and the respective first and second anchoring points become slack, said elements, when moved inwardly towards each other by said first and second arm means, engaging a refuse container located therebetween and wrapping about opposite sides of said container to thereby be placed in tension to grip said container.

* * * * *